UNITED STATES PATENT OFFICE.

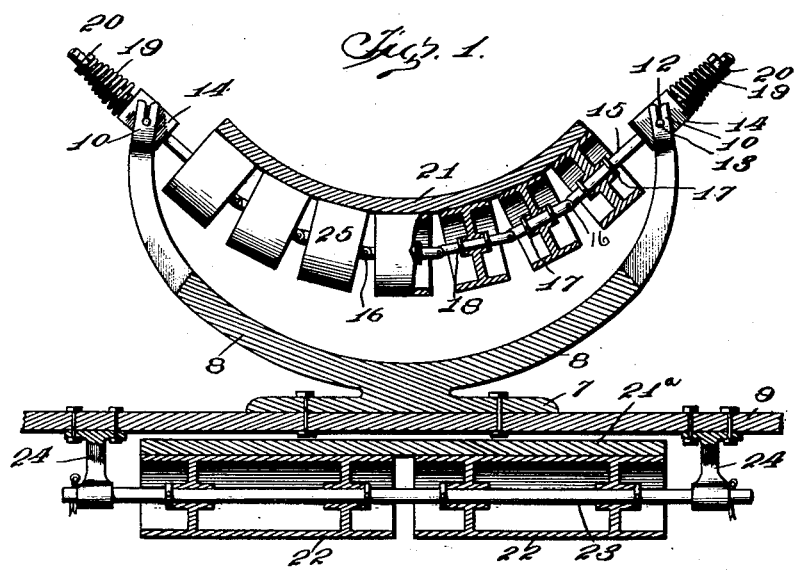
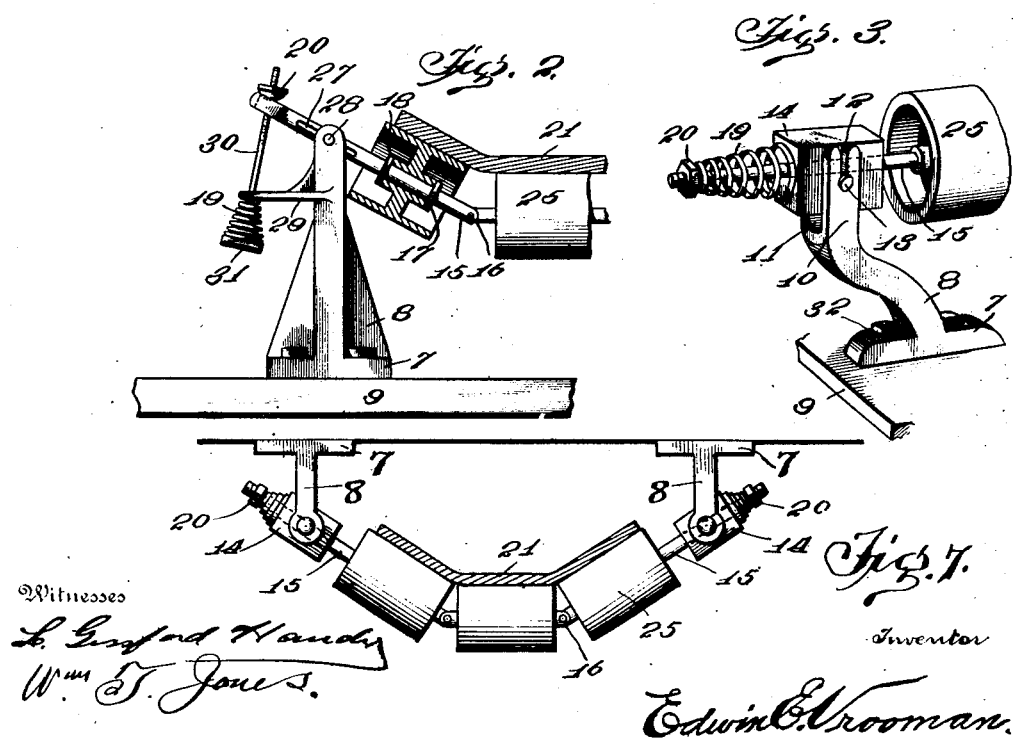

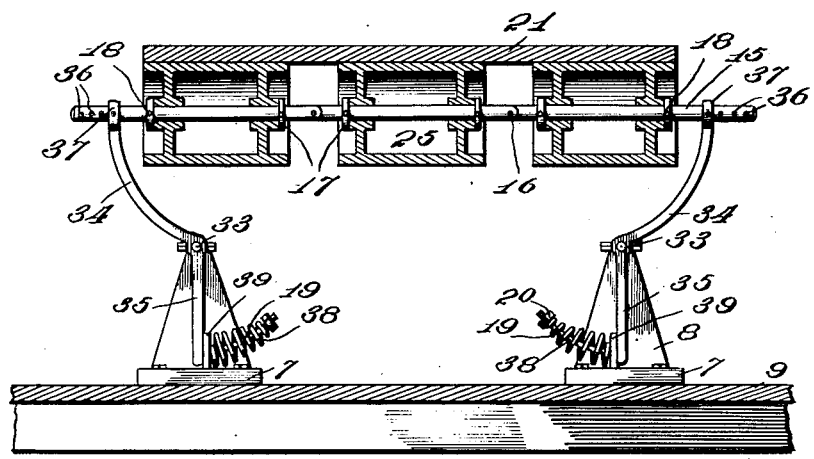
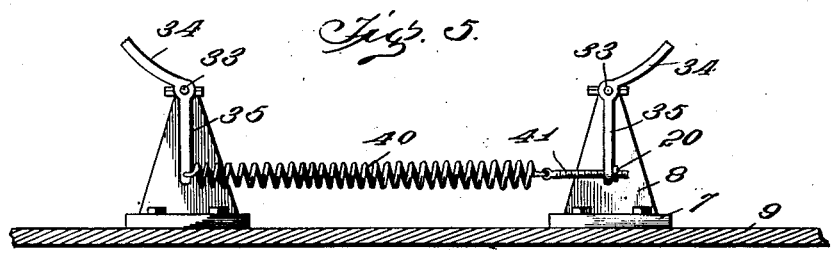
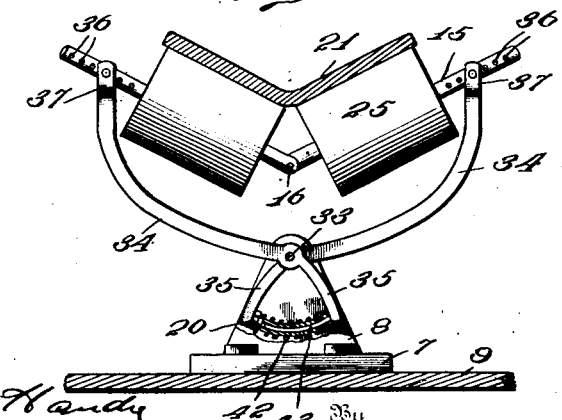

EDWIN E. VROOMAN, OF HYATTSVILLE, MARYLAND, ASSIGNOR, BY DIRECT AND MESNE ASSIGNMENTS, OF ONE-HALF TO JOHN J. RIDGWAY, OF CHICAGO, ILLINOIS, AND ONE-HALF TO EDWARD G. THOMAS, OF BROOKLINE, MASSACHUSETTS.

CONVEYER-BELT SUPPORT.

No. 909,833.    Specification of Letters Patent.    Patented Jan. 12, 1909.

Application filed October 27, 1903. Serial No. 178,711.

*To all whom it may concern:*

Be it known that I, EDWIN E. VROOMAN, a citizen of the United States, residing at Hyattsville, in the county of Prince George and State of Maryland, have invented certain new and useful Improvements in Conveyer-Belt Supports; and I do hereby declare the following to be a full, clear, and exact description of the invention, such as will enable others skilled in the art to which it appertains to make and use the same.

My invention relates to improvements in conveyer-belt supports, and particularly to improvements in methods of so supporting the belt as to maintain it in a troughed position under load.

It consists of means whereby the amount which the belt is bent or troughed is automatically adjustable to correspond to variations in the load carried, and further provides a means for so troughing the belt which will practically maintain the belt in a curve of even radius throughout its width.

The present means of troughing carrier belts consist in general of either two or three pulleys having their axes inclined at fixed angles to one another. These devices cause the belt to assume, at all times, a shape consisting of two or more straight portions separated by sharply curved portions. Where the bending of the belt is greatest, it deteriorates most rapidly, and this feature is largely overcome by my improved device, since the belt is bent to a maximum degree only when fully loaded.

The further advantages of the device I have invented are that the belt is troughed to its maximum amount only when carrying its maximum load. At other times, the troughing is less than this maximum, and, therefore, the wear due to the bending of the belt is greatly reduced.

A further advantage lies in the fact that the belt support is resilient or springy; and if a heavy weight is dropped upon the belt, the support will yield without damage, such as might occur if the belt supports were rigid.

My invention consists, in brief, of flexible, resilient belt-carrying means suspended under tension from and spanning the distance between two opposed fixed supports, to which the belt-carrying means is connected by members so pivoted as to be able to vary their position in accordance with the direction of the strain brought upon them. The belt-carrying means is adapted to vary in length between the pivoted members above referred to, in order that under a heavy load it may sag to a greater extent than under a lighter load; and this variation in length is made automatic by its resilience. The necessary elasticity of the belt supporting means is provided by the introduction of springs.

Several embodiments of my invention are disclosed by drawings which accompany and form a part of this specification.

In the drawings: Figure 1 is a view in side elevation, partly shown in section, of a conveyer-belt support constructed in accordance with the present invention, the belt-engaging means being shown in position for troughing the belt. Fig. 2 is a fragmentary side-view of another embodiment of the present invention. Fig. 3 is a fragmentary, perspective view of another embodiment of the present invention. Fig. 4 is a view in side elevation, partly shown in longitudinal section, of another embodiment of this invention, the belt-engaging means being shown in a horizontal position. Fig. 5 is a fragmentary view, in side elevation, of another embodiment of this invention. Fig. 6 is a view in side elevation of another embodiment of this invention, showing the belt-engaging means in position for troughing a belt. Fig. 7 is a view in side elevation of another embodiment of this invention, showing the same secured to an overhead support, and the belt-engaging means in position for troughing a belt.

Referring to the drawings by numerals, and particularly to the embodiment depicted in Fig. 1, the base 7 of the brackets or supporting-means 8 is preferably secured to a horizontal support 9, by any suitable means. The upper ends 10 of the brackets 8 are bifurcated, as at 11, Fig. 3, and the bifurcated ends are provided preferably with vertical slots 12 for facilitating mounting the pivots 13 of the trunnion blocks or bearings 14 within the bifurcated ends of the brackets.

The embodiments depicted in Figs. 1, 3 and 7 are my preferred structures. In each of these embodiments, the freely-movable bearings or members 14 are pivoted, intermediate their ends, within the bifurcated ends of the brackets. It will be obvious that the brackets 8, shown in Fig. 7, are in a reverse position to the brackets shown in Figs. 1 and 2, and that said brackets in Fig. 7 are secured to an overhead support, by any suitable fastening means.

A shaft 15 is carried by the bearings or blocks 14, constituting pivoted members, and said shaft 15 is composed of a plurality of sections or short shafts, which sections or short shafts are pivotally connected, at 16. Preferably, journaled upon each section or short shaft is an idler 25, which idler 25 is longitudinally-adjustable upon the section or short shaft, by means of collars 17, which are, preferably, adjustably secured in a fixed position upon the section or short shaft, by any suitable means, as set-screw 18. I preferably employ horizontal coil springs 19, in constructing my conveyer-belt support, carried by the ends of the sections of shaft 15, which sections extend through the bearings or blocks 14. The extreme outer ends of shaft 15 are preferably screw-threaded, and threaded upon said ends are nuts 20, which are adapted to be threaded against the outer ends of the springs 19 for holding the springs in operative relation with shaft 15. The shaft 15 (composed of a plurality of sections or short shafts), idlers 25, and springs 19 constitute a flexible roller for supporting the upper run of the belt 21. Horizontal idlers 22 are journaled upon shaft 23, and said shaft 23 is carried by brackets 24, secured to a support 9. These idlers 22 support the lower run 21ª of the conveyer-belt 21. By providing a horizontal, coiled spring, constituting yielding means, in the construction of the belt-supporting means, of a conveyer-belt support, in accordance with the present invention, the flexible roller is automatically-adjustable under the weight of a load; said belt-supporting means or flexible roller spans the distance between and is only supported near its ends upon the bearings or pivoted members 14.

In the embodiment depicted in Fig. 2, I have only illustrated substantially one-half of the belt-support, but as the other half of the support is of the same structure, it will only be necessary to describe one-half or one-end of the belt-support. The ends of shaft 15, or the outer sections of said shaft, are provided with elongated slots 27. Bracket 8 is provided with a pin or support 28, extending through the slot 27, whereby the outer sections of the shaft 15 are permitted to have a sliding movement upon the brackets 8. A horizontal extension 29 is formed upon bracket 8, and a bolt 30, provided at its lower end with a head 31, is slidably mounted within the extension 29 and the outer section of shaft 15. A coiled spring or yielding means 19 is mounted upon rod or bolt 30 between the extension 29 and the head 31. By means of a nut 20, threaded upon the upper end of rod or bolt 30, the tension of the spring 19 can be controlled for exerting a greater or less pull upon shaft 15, tending to normally retain said shaft and idlers 25 in an approximately horizontal position.

In the embodiment depicted in Fig. 4, pivoted at 33, upon brackets 8, are arms 34, which arms terminate at their lower ends in vertical extensions 35. The sectional shaft 15 is provided near its outer end with a plurality of apertures 36, permitting the upper ends 37 of the arms 34 to be connected to the shaft 15 in different positions thereon. Extensions or spurs 38 project preferably inwardly from extensions 35 of arms 34, and said extensions 38 extend through lugs 39, formed preferably, upon bases 7 of the brackets 8. Nuts 20 are threaded upon the outer ends of the extensions or spurs 38, and between said nut 20 and lugs 29, springs 19 are secured, so that when the weight of a load carried by belt 21 is upon the idlers and shaft 15, the arms 34 will pivot, at 33, and allow the shaft 15 and idlers 25, constituting the flexible roller, to trough according to the weight of the load, and as soon as the load is removed from the flexible roller, the springs will cause the same to assume substantially a horizontal position.

The embodiment depicted in Fig. 5 is substantially the same as that depicted in Fig. 4, except that a coil spring 40 is connected at one end to an extension 35 of one of the arms 34, and at its opposite end to a screw-threaded bolt or member 41, which member 41 extends through the extension 35 of the other arm 34, and upon the extended end of said bolt or member, there is threaded a nut 20, whereby the tension of the spring 40 may be controlled. Through the medium of this spring 40, bolt 41, and nuts 20, the belt-supporting means, carried by the brackets, can be caused to offer a greater or less resistance against troughing with respect to the belt when a load is carried thereby. It will be obvious that if the tension of the spring is increased, as by threading nut 20 towards the inner end of member 41, a greater strain will be exerted upon the arms for holding the belt-supporting means in an approximately horizontal position, than would be the case if the nut 20 was adjusted towards the outer end of bolt 41 for permitting the spring 40 to be somewhat relaxed.

In the embodiment depicted in Fig. 6, the arms 34 are pivoted on a common axis, as at 33, and secured to one of the extensions 35, is preferably a curved, hollow tube, upon which is mounted a spring 42. A curved, integral extension or slide 43 is secured to the other arm and is slidably retained within the hollow, curved tube carried by the other arm. The hollow, curved tube is screw-threaded upon its outer face for receiving an adjusting nut 20. The spring 42 is removably mounted upon said tube, and by means of the nut, the tension of said spring can be controlled. When a load is upon the belt 21, the idlers 25 will sag, owing to the arms 34 being pivoted upon bracket 8, causing the member 43 to slide within the curved tube.

It will be noted that in the different embodiments, I have shown means whereby a sudden strain upon the belt-engaging means, as for instance, a load thrown upon the belt, will not injure the support by reason of the shock being taken up by the spring or springs. Furthermore, it will be obvious that from the foregoing statement, the shaft is cushioned against sudden jars or strains thereon. I have also shown the nuts 20 as means for controlling the tension of the spring or springs 19, (constituting the cushion of the shaft), so as to control the rigidity of the flexible roller, constituted by said shaft, idlers and springs, as it will be obvious that if the springs are compressed upon the bearings or pivoted members 14, by threading the nuts 20 tight against said spring, it will take a greater load to depress the flexible roller than would be the case if the pressure upon the springs was relieved to a great extent by threading the nuts 20 towards the ends of the shaft.

From the foregoing, it will be noted that my belt-support comprises preferably brackets provided with bifurcated ends, pivoted members or bearings mounted within said bifurcated ends, and automatically-adjustable belt-supporting means carried by said pivoted members; the belt-supporting means provided with a coiled spring, and said belt-supporting means and pivoted members being normally retained in an approximately horizontal position.

Having thus fully described my invention, what I claim as new and desire to secure by Letters Patent is:—

1. A conveyer belt supporting mechanism comprising belt supporting means, and automatically adjustable supports therefor.

2. A conveyer belt supporting mechanism comprising means independent of the belt, actuated by a load upon said belt for troughing the belt and retaining the load thereon, and means normally retaining said troughing means out of a troughed condition.

3. A conveyer belt supporting mechanism comprising means normally retained in a horizontal position, independent of the belt and actuated by a load upon said belt to move vertically.

4. In a conveyer belt supporting mechanism, the combination, of a flexible shaft, a plurality of pulleys or the like journaled thereon, and cushioning means for said shaft.

5. In a conveyer belt supporting mechanism, the combination, of a flexible cushioned shaft, a plurality of pulleys or the like journaled thereon, and means for adjusting said pulleys upon said shaft.

6. In a conveyer belt supporting mechanism, the combination, of a cushioned sectional shaft, a pulley or the like journaled upon each section thereof, and means for adjusting the cushion of said shaft.

7. In a conveyer belt supporting mechanism, the combination, of a swinging flexible shaft, pulleys journaled thereon, and cushioning means assembled with said shaft for normally holding the same in a horizontal position.

8. A conveyer belt supporting mechanism comprising a pair of vertically extending supports, belt carrying means secured thereto and adapted to give under the weight of a load, and means for automatically changing the position of said belt carrying means, after the removal of a load.

9. A conveyer belt supporting mechanism comprising a sectional shaft, a plurality of rotating belt-engaging means journaled thereon, and means for automatically adjusting the said shaft in a vertical plane.

10. A conveyer belt supporting mechanism comprising a transversely yielding positioned belt support, and cushions for the ends of said support.

11. In a conveyer belt supporting mechanism, the combination, of a plurality of arms secured to standards, a transverse, flexible shaft secured between said arms, a plurality of pulleys or the like journaled upon said shaft, and a spring carried by said shaft at each end thereof.

12. A conveyer-belt support, comprising a framework, belt supporting means mounted on said framework transverse of the belt, said means adapted to be actuated by a load upon the belt for holding the same in a troughed position and returning the belt to its normally flat position when the load is removed therefrom.

13. A conveyer belt supporting mechanism comprising an automatic adjustable support, and belt supporting means carried thereby.

14. In a conveyer, the combination of a tilting belt-support, and cushioning means for actuating the same.

15. In a conveyer, the combination of a sectional shaft, and a longitudinally adjustable idler journaled thereon.

16. In a mechanism of the class described, the combination of standards, trunnion blocks supported upon said standards, a sectional shaft engaging and supported upon said trunnion blocks, and an idler journaled upon said shaft.

17. In a mechanism of the class described, the combination with a support, of trunnion blocks carried by said support, and vertically adjustable, belt-engaging means carried by said blocks.

18. In a mechanism of the class described, the combination with a support, of pivotally mounted members carried by said support, a shaft positioned within said members, said shaft being capable of longitudinal movement within said members, and belt-engaging means carried by said shaft.

19. In a conveyer-belt support, the combination of a pair of brackets, each bracket provided with a bifurcated end, members pivoted intermediate their ends within the bifurcated ends of said brackets, and belt-supporting means provided with a horizontal spring, connecting said pivoted members, said spring automatically adjusting said belt-supporting means under the action of a load.

20. In a conveyer-belt support, the combination of brackets, each bracket provided with a bifurcated end, members pivoted within the bifurcated ends of said brackets, and automatically-adjustable belt-supporting means provided with a coiled spring, spanning the distance between and supported only upon said pivoted members.

21. A conveyer-belt support, comprising supporting means, a pair of freely-pivoted members carried by said supporting-means, and automatically-adjustable belt-supporting means provided with a horizontal spring, spanning the distance between and supported upon said pivoted members.

22. In a conveyer belt-support, the combination with a plurality of brackets, of members pivoted intermediate their ends upon said brackets, and automatically-adjustable belt-supporting means provided with a horizontal, coiled spring and with short shafts, supported upon said pivoted members, said shafts positioned within said pivoted members and said spring positioned near one end of a pivoted member.

23. A conveyer belt support, comprising supporting means, pivoted members carried by said supporting-means, and automatically-adjustable belt-supporting-means carried by said pivoted members.

24. A conveyer-belt support, comprising supporting-means, a pair of freely-movable pivoted members carried by said supporting-means, and automatically-adjustable belt-supporting means spanning the distance between and supported upon and provided with a portion extending into said pivoted members.

25. In a conveyer-belt support, the combination of pivoted supporting means, and automatically-adjustable belt-supporting means spanning the distance between and only supported near its ends upon said pivoted supporting-means, said belt-supporting means normally retained in approximately a horizontal position and adapted automatically to assume different vertical positions under the weight of a load.

26. A conveyer-belt support, comprising supporting-means, pivoted members secured to said supporting-means, and a flexible roller carried by said pivoted members.

27. A conveyer-belt support, comprising supporting-means, pivoted bearings carried by said supporting-means, and a horizontal, flexible roller only supported near its ends within said bearings, said roller assuming different vertical positions under the action of a load upon the belt.

28. A conveyer-belt support, comprising brackets, each bracket provided with a bifurcated end, bearings pivotally mounted within the bifurcated ends of said brackets, and load-actuated belt-supporting means spanning the distance between and movably supported within said pivoted bearings.

29. A conveyer-belt support, comprising brackets, each bracket provided with an upper, bifurcated end, bearings pivotally mounted within the bifurcated ends of said brackets, and load-actuated, automatically-adjustable belt-supporting means, normally retained in an approximately horizontal position, spanning the distance between and carried by the pivoted bearings, said belt-supporting means comprising short shafts movably mounted within said pivoted bearings, and flexible means connecting said shafts.

30. In a conveyer-belt support, the combination of brackets, members pivoted intermediate their ends, within a portion of said brackets, and automatically-adjustable belt-supporting means supported only near its ends upon said pivoted members and adapted to assume different vertical positions under the action of a load, whereby said pivoted members are tilted within said brackets.

31. In an automatically-adjustable, load-actuated conveyer-belt support, the combination of brackets, bearings pivotally mounted intermediate their ends within portions of said brackets, and automatically-adjustable load-actuated belt-supporting means supported only near its ends upon said members, whereby vertical movement of the belt-supporting means under the action of a load, will tilt said bearings upon their pivot.

32. In a conveyer-belt support, the combination with supporting-means, of freely-pivoted members carried by said supporting-means, and means provided with a spring carried by said pivoted members, said spring positioned transversely of the longitudinal axis of a belt when engaging said belt-supporting means and said spring normally positioned in substantially a horizontal plane, said spring serving, under the action of a load upon the belt, to automatically adjust the belt-supporting means.

33. In a conveyer-belt support, the combination of resilient belt-engaging means, and adjustable supporting members therefor.

34. In a conveyer-belt support, the combination of two opposed brackets, resilient belt-supporting means, and automatically adjustable members connecting said belt-supporting means to and suspending the same between said brackets.

35. In a conveyer-belt support, the combination of an automatically adjustable belt-engaging means, and pivoted supporting members therefor.

36. In a conveyer-belt support, the combination of an automatically-adjustable belt-engaging means, and pivoted supporting members connected to said belt-engaging means at its ends.

37. In a conveyer-belt support, the combination of belt-engaging means, automatically vertically-adjustable under changes in load, and adjustable supporting members for said belt-engaging means.

38. In a conveyer-belt support, the combination of two opposed supports, members pivoted to said supports, and flexible belt-engaging means extending between said members and adapted to vary in length between said members under variations in the loading of the belt.

39. In a conveyer-belt support, the combination of two opposed supports, flexible belt-engaging means, and pivoted members connecting said belt-engaging means to and hanging the same between said supports.

40. In a conveyer-belt support, the combination of two opposed supports, extensible belt-engaging means, and pivoted members connecting said belt-engaging means to and hanging the same between said supports.

41. In a conveyer-belt support, the combination with supports, of flexible belt-carrying means supported at its ends by and adapted to sag between said supports a variable amount in accordance with variations in the load upon the belt, and members connecting said supports and said belt-carrying means, adapted to automatically adjust their position to correspond with variations in the sag of said belt-carrying means.

42. In a conveyer-belt support, the combination of automatically variable belt-troughing means, supports therefor, and angularly adjustable connections between said belt-troughing means and said supports.

43. In a conveyer belt support, the combination of two opposed supports and contractible belt-engaging means, and adjustable members connecting said belt-engaging means to said supports, substantially as described.

In testimony whereof I have signed my name to this specification in the presence of two subscribing witnesses.

EDWIN E. VROOMAN.

Witnesses:
CASSELL SEVERANCE,
LEWIS I. BOYNTON.